United States Patent
Angus et al.

(10) Patent No.: US 9,542,180 B2
(45) Date of Patent: Jan. 10, 2017

(54) VEHICLE CONFIGURATION DRIVEN LOADING OF SOFTWARE PARTS

(71) Applicant: The Boeing Company, Chicago, IL (US)

(72) Inventors: Ian Gareth Angus, Mercer Island, WA (US); Olga C. Walker, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 127 days.

(21) Appl. No.: 14/250,478

(22) Filed: Apr. 11, 2014

(65) Prior Publication Data
US 2015/0293765 A1    Oct. 15, 2015

(51) Int. Cl.
*G06F 9/44* (2006.01)
*G06F 9/445* (2006.01)
*G06F 11/30* (2006.01)

(52) U.S. Cl.
CPC . *G06F 8/71* (2013.01); *G06F 8/60* (2013.01); *G06F 8/61* (2013.01); *G06F 11/3013* (2013.01)

(58) Field of Classification Search
None
See application file for complete search history.

(56) References Cited

U.S. PATENT DOCUMENTS

| | | | |
|---|---|---|---|
| 6,360,334 B1 | 3/2002 | Kavanagh et al. | |
| 7,636,568 B2 | 12/2009 | Gould et al. | |
| 8,055,393 B2 | 11/2011 | Sims, III et al. | |
| 8,442,751 B2 | 5/2013 | Kimberly et al. | |
| 8,452,475 B1 | 5/2013 | West et al. | |
| 2003/0208579 A1* | 11/2003 | Brady, Jr. | G06F 8/65 709/223 |
| 2004/0106404 A1* | 6/2004 | Gould | B64D 47/00 455/431 |
| 2005/0187668 A1* | 8/2005 | Baumgarte | G06F 8/60 701/1 |
| 2009/0070841 A1* | 3/2009 | Buga | H04B 7/18506 725/116 |
| 2009/0138518 A1 | 5/2009 | Rodgers et al. | |

(Continued)

FOREIGN PATENT DOCUMENTS

EP    2175613 A1    4/2010

OTHER PUBLICATIONS

Extended European Search Report, dated Aug. 13, 2015, regarding Application No. EP15153548.1, 7 pages.
(Continued)

*Primary Examiner* — Insun Kang
(74) *Attorney, Agent, or Firm* — Yee & Associates, P.C.

(57) ABSTRACT

A system and method of loading software parts on a vehicle. Information identifying a desired software configuration for active software parts on the vehicle is received by a processor unit. The processor unit identifies a current software configuration of the active software parts on the vehicle. The processor unit determines a dataload plan for loading the software parts on the vehicle based on a difference between the desired software configuration and the current software configuration. The dataload plan identifies an order for loading the software parts on the vehicle. The dataload plan is used for loading the software parts on the vehicle to make the software parts active on the vehicle.

19 Claims, 7 Drawing Sheets

(56) References Cited

U.S. PATENT DOCUMENTS

| | | | |
|---|---|---|---|
| 2009/0138873 A1 | 5/2009 | Beck et al. | |
| 2009/0138874 A1 | 5/2009 | Beck et al. | |
| 2009/0198393 A1 | 8/2009 | Sims, III et al. | |
| 2010/0235289 A1* | 9/2010 | Frayssignes | G06Q 30/016 705/304 |
| 2013/0067450 A1* | 3/2013 | Saugnac | G06F 8/65 717/170 |
| 2013/0247025 A1* | 9/2013 | Barberet | G06F 8/65 717/173 |
| 2014/0258257 A1* | 9/2014 | Schowalter | G06F 8/61 707/705 |
| 2014/0282479 A1* | 9/2014 | Frayssignes | G06F 8/65 717/171 |
| 2014/0337630 A1 | 11/2014 | Kimberly et al. | |

OTHER PUBLICATIONS

Extended European Search Report, dated Dec. 15, 2014, regarding Application No. EP14187131.9, 8 pages.

Aeronautical Radio, Inc., "Guidance for the Management of Field Loadable Software," ARINC Report 667-1, Novmeber 12, 2010, 120 pages.

Kimberly et al., "Use of Multiple Digital Signatures and Quorum Rules to Verify Aircraft Information," U.S. Appl. No. 13/888,730, filed May 7, 2013, 32 pages.

Angus et al., "Aircraft Configuration and Software Part Management Using a Configuration Software Part," U.S. Appl. No. 14/097,982, filed Dec. 5, 2013, 62 pages.

Canadian Office Action mailed Dec. 21, 2015, regarding application No. 2,865,660, 5 pages.

Office Action, dated Sep. 21, 2016, regarding U.S. Appl. No. 14/097,982, 54 pages.

* cited by examiner

VEHICLE CONFIGURATION DRIVEN LOADING OF SOFTWARE PARTS

BACKGROUND INFORMATION

1. Field

The present disclosure relates generally to aircraft and other vehicles and, in particular, to software parts and the configuration of software parts on an aircraft or other vehicle. Still more particularly, the present disclosure relates to a method and apparatus for loading software parts on an aircraft or other vehicle, to make the software parts active on the aircraft or other vehicle, based on the difference between a current configuration of software and hardware on the aircraft or other vehicle and a desired configuration for the aircraft or other vehicle.

2. Background

Modern aircraft are extremely complex. For example, an aircraft may have many types of electronic systems on board. An electronic system on an aircraft may be a line-replaceable unit (LRU). A line-replaceable unit is designed to be easily replaceable.

An electronic system may take on various forms. An electronic system on an aircraft may be, for example, without limitation, a flight management system, an autopilot, an in-flight entertainment system, a communications system, a navigation system, a flight controller, a flight recorder, and a collision avoidance system. The various electronic systems on an aircraft may communicate with each other via digital networks on the aircraft.

Electronic systems may use software or programming to provide the logic or control for various operations and functions. The software used in electronic systems on aircraft is commonly treated as parts in the airline industry. In particular, a software application for use in a line-replaceable unit on an aircraft may be tracked separately from the line-replaceable unit itself. Aircraft software that is treated as an aircraft part may be referred to as a loadable software aircraft part, an aircraft software part, or simply as a software part. A software part may be considered a separately identified part of the configuration of an aircraft, rather than part of the hardware which operates the software.

Aircraft operators are entities that operate aircraft. Examples of aircraft operators include airlines and military units. Aircraft operators may be responsible for the maintenance and repair of aircraft. Maintenance and repair of an aircraft may include loading software parts on the aircraft.

Software parts are typically already installed in the electronic systems on an aircraft when an aircraft operator receives an aircraft. For example, software parts for the electronic systems may be provided by the aircraft manufacturer and installed on the aircraft by the aircraft manufacturer before the aircraft is delivered to the operator. The aircraft operator may also receive copies of these loaded software parts in case the parts need to be reinstalled or reloaded into the electronic systems on the aircraft. Reloading of software parts may be required, for example, if a line-replaceable unit in which the software is used is replaced or repaired.

An aircraft operator also may receive updates to the software parts from the aircraft manufacturer from time to time. These updates may include additional features not present in the currently-installed software parts and may be considered upgrades to one or more electronic systems. These updates also may be loaded on the aircraft by the aircraft operator.

An aircraft operator also may provide software parts for an aircraft. Operator provided software parts may be loaded on the aircraft by the aircraft manufacturer before the aircraft is delivered to the operator. Operator provided software parts also may be loaded on the aircraft by the operator after delivery. For example, operator software parts that were installed on the aircraft by the manufacturer may need to be reloaded on the aircraft in some cases. Updates to the operator software parts also may be loaded on the aircraft by the operator from time to time.

Specified procedures may be followed by the operator of an aircraft during loading of manufacturer and operator provided software parts on an aircraft so that the current configuration of the aircraft is known. The software configuration of an aircraft includes all of the software parts that are loaded and active on the aircraft.

Effective and efficient loading of software parts on an aircraft is desirable. For example, successful business operations of an airline or other aircraft operator may require timely loading of software parts on an aircraft using available technological and human resources. Slowness of loading software parts on an aircraft that increases gate turn time or results in a dispatch delay may affect the business operations of an airline or other aircraft operator in an undesired manner. Systems and a method for loading software parts on an aircraft in a timely manner, using fewer resources, or both, are desirable to improve the business operations of an airline or other operator of the aircraft.

Accordingly, it would be beneficial to have a method and apparatus that take into account one or more of the issues discussed above, as well as possibly other issues.

SUMMARY

The illustrative embodiments of the present disclosure provide a method of loading software parts on a vehicle. Information identifying a desired software configuration for active software parts on the vehicle is received by a processor unit. A current software configuration of the active software parts on the vehicle is identified by the processor unit. The processor unit determines a dataload plan for loading the software parts on the vehicle based on a difference between the desired software configuration and the current software configuration. The dataload plan identifies an order for loading the software parts on the vehicle. The dataload plan is used for loading the software parts on the vehicle to make the software parts active on the vehicle.

The illustrative embodiments of the present disclosure also provide an apparatus comprising a dataload planner. The dataload planner is configured to receive information identifying a desired software configuration for active software parts on a vehicle, identify a current software configuration of the active software parts on the vehicle, and determine a dataload plan for loading software parts on the vehicle to make the software parts active on the vehicle based on a difference between the desired software configuration and the current software configuration. The dataload plan identifies an order for loading the software parts on the vehicle.

The features, functions, and benefits can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of illustrative embodiments of the present disclosure when read in conjunction with the accompanying drawings, wherein:

DETAILED DESCRIPTION

Figure 1:
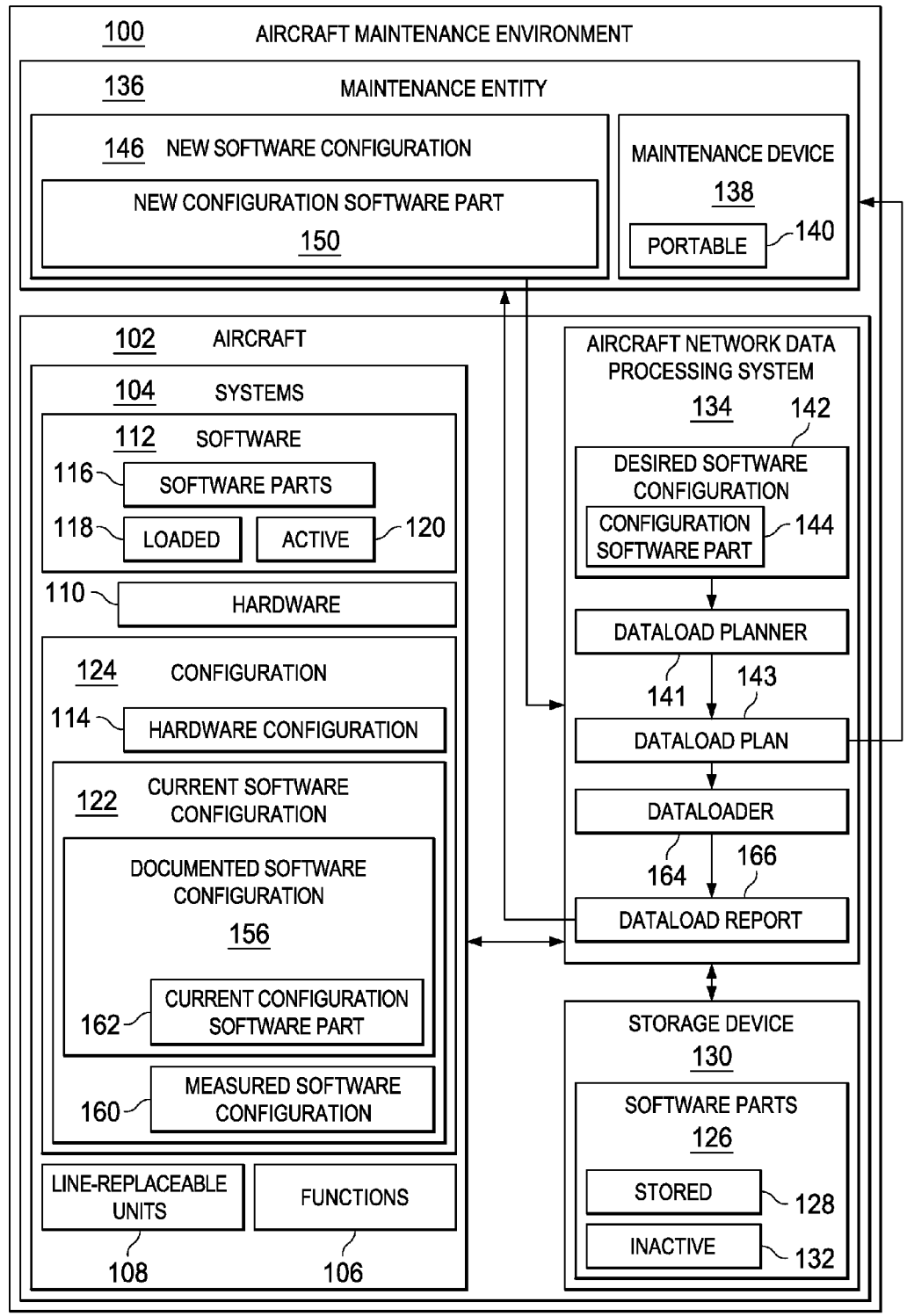
FIG. 1 is an illustration of a block diagram of an aircraft maintenance environment in accordance with an illustrative embodiment.

The different illustrative embodiments recognize and take into account a number of different considerations. "A number," as used herein with reference to items, means one or more items. For example, "a number of different considerations" are one or more different considerations.

The different illustrative embodiments recognize and take into account that current processes for loading software parts on an aircraft are substantially manual. For example, currently software parts may be loaded on aircraft systems one part at a time. For a relatively complex dataloading scenario, manual instructions may be prepared that define which software parts are to be loaded on which systems on the aircraft and the order in which the software parts are to be loaded on the aircraft systems.

The different illustrative embodiments recognize and take into account that the various systems for performing various functions on an aircraft comprise distributed systems with components at various locations on the aircraft. The order of loading software parts in such distributed systems may be important. For example, loading software parts on distributed systems on an aircraft in the wrong order could put the systems in an unrecoverable state.

The different illustrative embodiments recognize and take into account that it is desirable that instructions for loading software parts on an aircraft are provided to and followed by a mechanic or other person loading the software parts in a timely manner. If the instructions for loading the software parts are not followed in a timely manner, an intervening maintenance operation on the aircraft may invalidate the assumptions under which the instructions for loading the software parts were created.

The different illustrative embodiments also recognize and take into account that it is also desirable that the mechanic or other person loading software parts on the aircraft keeps careful track of the process as instructions for loading the software parts are followed. A deviation from the instructions in the software loading process may put the aircraft in an undesirable state that may be difficult to recover from. The different illustrative embodiments also recognize and take into account that currently the mechanic or other person performing the loading of software parts on an aircraft may need to figure out how to recover from the loading of software parts on an aircraft that is not completed successfully for any reason.

The different illustrative embodiments also recognize and take into account that the number of software parts on an aircraft is increasing as aircraft become more electronically enabled. Therefore, the task of loading software parts on an aircraft is increasing in complexity and current manual processes for loading software parts are increasingly inadequate.

The different illustrative embodiments further recognize and take into account that newer aircraft may provide more capabilities. For example, newer aircraft may implement the capability for the systems on the aircraft to report on the hardware configuration of the systems and the software that is currently loaded on them. However, such capabilities currently may not be taken advantage of to improve the process of loading software parts on the aircraft.

Illustrative embodiments use the current software and hardware configuration of an aircraft, along with a desired configuration for the software on the aircraft, to generate a plan for loading software parts to make the software parts active on the aircraft systems in an expeditious manner. A dataload plan generated in accordance with an illustrative embodiment may be executed by a dataloader to load software parts on the aircraft in accordance with the plan. For cases where there is an ambiguity or options with regard to which software part should be loaded or the order of loading software parts, the ambiguity or options may be resolved either manually or automatically.

Illustrative embodiments also may feature generating a rollback plan. A rollback plan is a plan for restoring the aircraft software back to an earlier configuration when dataloading of software parts using the dataload plan is not completed successfully for some reason. Illustrative embodiments also may provide a report describing the operations that were performed during the dataloading process.

Turning to FIG. 1, an illustration of a block diagram of an aircraft maintenance environment is depicted in accordance with an illustrative embodiment. Aircraft maintenance environment 100 may include any appropriate environment for maintaining aircraft 102.

Aircraft 102 may be a commercial passenger aircraft, a cargo aircraft, a private or personal aviation aircraft, a military aircraft, or any other appropriate type of aircraft that may be used for any appropriate purpose. Aircraft 102 may include various systems 104 for performing various functions 106 on aircraft 102. For example, without limitation, systems 104 may include line-replaceable units 108 for performing various functions 106 on aircraft 102.

Systems 104 on aircraft 102 may comprise hardware 110 and software 112. Any appropriate hardware 110 or hardware 110 in combination with software 112 may be used to implement functions 106 performed by systems 104 on aircraft 102.

Hardware 110 on aircraft 102 comprises hardware configuration 114 of aircraft 102. Hardware configuration 114 also may be referred to as the current hardware configuration of aircraft 102.

Software 112 on aircraft 102 may comprise software parts 116. Software parts 116 may be loaded 118 on systems 104 to implement functions 106 performed by systems 104 on aircraft 102. Software parts 116 that are loaded 118 on systems 104 on aircraft 102 also may be referred to as active 120. Software parts 116 that are loaded 118 and active 120 on systems 104 comprise current software configuration 122 of aircraft 102. Current software configuration 122 also may be referred to as the actual software configuration of aircraft 102.

Hardware configuration 114 and current software configuration 122 together may define configuration 124 of aircraft 102. Configuration 124 also may be referred to as the current configuration of aircraft 102.

Software parts 126 that are not loaded 118 and active 120 on systems 104 of aircraft 102 may be stored 128 in storage device 130 on aircraft 102. Software parts 126 that are stored in storage device 130 on aircraft 102 also, or alternatively, may include copies of software parts 116 that are loaded 118 and active 120 on systems 104. Software parts 126 that are stored 128 in storage device 130 on aircraft 102 also may be referred to as inactive 132. Software parts 126 that are stored 128 in storage device 130 and inactive 132 may not be considered to be part of current software configuration 122 of aircraft 102. Storage device 130 may include any number of appropriate hardware devices for storing software parts 126 on aircraft 102. Storage device 130 also may be referred to as a mass storage device.

For example, without limitation, software parts 126 may be stored 128 in storage device 130 on aircraft 102 before being loaded 118 and made active 120 on systems 104 of aircraft 102. Software parts 126 that are stored 128 in storage device 130 may include software parts 126 that were loaded 118 on systems 104 at some time in the past, and thus at some time were part of configuration 124 of aircraft 102, but that are not part of current software configuration 122 of aircraft 102. Software parts 126 that are stored 128 in storage device 130 may include copies of software parts 116 that are loaded 118 and active 120 on systems 104 and thus are part of current software configuration 122 of aircraft 102. Software parts 126 that are stored 128 in storage device 130 may include new software parts 126 that may be loaded 118 and made active 120 on systems 104, and thus may become part of current software configuration 122 of aircraft 102 in the future.

Communications between and among systems 104 and storage device 130 on aircraft 102 may be provided by aircraft network data processing system 134. For example, without limitation, aircraft network data processing system 134 on aircraft 102 may be configured to receive software parts 126, store software parts 126 in storage device 130, and load software parts 126 from storage device 130 on systems 104 of aircraft 102. Software parts 126 from storage device 130 that are loaded 118 on systems 104 become software parts 116 that are active 120.

Software parts 116 may be loaded 118 on systems 104 on aircraft 102 by a manufacturer of aircraft 102 before aircraft 102 is delivered to an operator of aircraft 102. The manufacturer of aircraft 102 may be any appropriate entity that has the responsibility for building aircraft 102 and providing aircraft 102 to the operator of aircraft 102. The manufacturer may provide manufacturer software parts for use on aircraft 102. Manufacturer software parts are an example of software parts 116 and software parts 126 for systems 104 on aircraft 102.

Software parts 116 also may be loaded 118 on systems 104 on aircraft 102 after the delivery of aircraft 102 to an operator of aircraft 102. For example, without limitation, software parts 116 may be loaded 118 on systems 104 on aircraft 102 to replace or update software parts 116 that were originally loaded 118 on systems 104 by the manufacturer of aircraft 102.

Software parts 116 may be loaded 118 on systems 104 on aircraft 102 by an operator of aircraft 102 as part of the process of maintaining aircraft 102 by the operator of aircraft 102. The operator of aircraft 102 may be any appropriate entity that is responsible for the operation of aircraft 102. For example, the operator of aircraft 102 may be an airline or other operator of aircraft 102. For example, without limitation, the operator of aircraft 102 may be a military organization or any other appropriate government or private entity or any appropriate combination of entities. The operator of aircraft 102 may provide operator software parts for use on aircraft 102. Operator software parts are another example of software parts 116 and software parts 126 for systems 104 on aircraft 102.

A third party supplier may be an entity other than the manufacturer of aircraft 102 and the operator of aircraft 102 that provides third party software parts for use on aircraft 102. The manufacturer of aircraft 102 may or may not produce all of the manufacturer software parts for use on aircraft 102 that are loaded 118 on systems 104 on aircraft 102 by the manufacturer of aircraft 102. For example, a portion of the manufacturer software parts may be produced by a third party supplier for the manufacturer of aircraft 102 or otherwise obtained by the manufacturer of aircraft 102 from a third party supplier. In this case, the manufacturer software parts may include third party software parts. An operator of aircraft 102 may or may not produce all of operator software parts provided by the operator of aircraft 102 for use on aircraft 102. For example, a portion of the operator software parts may be produced by a third party supplier for the operator of aircraft 102 or otherwise obtained by the operator of aircraft 102 from a third party supplier. In this case, the operator software parts may include third party software parts. Third party software parts are another example of software parts 116 and software parts 126 for systems 104 on aircraft 102.

Software parts 116 may be loaded 118 on systems 104 on aircraft 102 by any appropriate entity after aircraft 102 is delivered from the manufacturer to an operator of aircraft 102. For example, without limitation, software parts 116 may be loaded 118 on systems 104 on aircraft 102 by maintenance entity 136. Maintenance entity 136 may be any appropriate entity that maintains aircraft 102 for an operator of aircraft 102. For example, without limitation, maintenance entity 136 may be the manufacturer of aircraft 102, the operator of aircraft 102, or any other appropriate entity.

An appropriate apparatus and method may be used by maintenance entity 136 to deliver software parts 126 to aircraft 102 for loading on systems 104 on aircraft 102. For example, without limitation, maintenance entity 136 may use maintenance device 138 to deliver software parts 126 to aircraft 102. Maintenance device 138 may be a laptop computer or another appropriate data processing device that is portable 140 with respect to aircraft 102. For example, without limitation, software parts 126 may be stored on maintenance device 138 and maintenance device 138 then may be moved to aircraft 102. A human technician may connect maintenance device 138 to aircraft network data processing system 134 on aircraft 102 via an appropriate wired or wireless connection. Software parts 126 then may be delivered to aircraft 102 by copying or otherwise moving software parts 126 from maintenance device 138 to aircraft network data processing system 134 on aircraft 102. Software parts 126 delivered to aircraft 102 may be stored in storage device 130 on aircraft 102 by aircraft network data processing system 134 before being loaded on systems 104 on aircraft 102.

Alternatively, or in addition, software parts 126 may be delivered to aircraft 102 without physically transporting software parts 126 to aircraft 102 on maintenance device 138. For example, without limitation, software parts 126 may be delivered to aircraft 102 via an appropriate wired or wireless connection between a software part library or other source of software parts 126 that is remote from aircraft 102 and aircraft network data processing system 134 on aircraft 102.

In accordance with an illustrative embodiment, dataload planner 141 may be configured to use information identifying desired software configuration 142, current software configuration 122, and hardware configuration 114 of aircraft 102 to determine dataload plan 143. For example, dataload planner 141 may be configured to determine dataload plan 143 based on the difference between desired software configuration 142 and current software configuration 122 of aircraft 102. Dataload plan 143 comprises a plan for loading software parts 126 on systems 104 on aircraft 102 to change configuration 124 of software 112 on aircraft 102 from current software configuration 122 to desired software configuration 142. For example, without limitation, dataload plan 143 may identify an appropriate order for loading software parts 126 from storage device 130 onto systems 104 to make software parts 116 active 120 on aircraft 102. Dataload plan 143 also may include a plan for rolling back the configuration of software 112 on aircraft 102 to current software configuration 122 if the loading of software parts 126 on systems 104 in accordance with dataload plan 143 has begun but is not completed successfully for any reason.

Desired software configuration 142 is a desired configuration for software 112 on aircraft 102 that is different from current software configuration 122. For example, information identifying desired software configuration 142 may include a list of software parts 116 that should be loaded 118 and active 120 on aircraft 102 when configuration 124 of software 112 on aircraft 102 is desired software configuration 142. For example, without limitation, desired software configuration 142 may be defined by configuration software part 144. Configuration software part 144 may be one of software parts 116 comprising current software configuration 122 of aircraft 102 when configuration software part 144 is loaded 118 on aircraft 102.

For example, dataload planner 141 may be configured to determine dataload plan 143 for changing current software configuration 122 of aircraft 102 to new software configuration 146. In this case, desired software configuration 142 may be new software configuration 146 for aircraft 102. For example, without limitation, information identifying new software configuration 146 for aircraft 102 may be provided by maintenance entity 136 to aircraft network data processing system 134 on aircraft 102 using maintenance device 138 or in another appropriate manner. For example, without limitation, new software configuration 146 may be defined by new configuration software part 150. In this case, configuration software part 144 defining desired software configuration 142 for aircraft 102 may be new configuration software part 150.

Dataload planner 141 may be configured to use documented software configuration 156 to identify current software configuration 122 of aircraft 102 for use in determining dataload plan 143. For example, without limitation, dataload planner 141 may use documented software configuration 156 to identify current software configuration 122 for use in determining dataload plan 143 when desired software configuration 142 for aircraft 102 is defined by new software configuration 146.

Documented software configuration 156 may be established before desired software configuration 142 is received by dataload planner 141 or otherwise before the process of generating dataload plan 143 by dataload planner 141 is started. Documented software configuration 156 may comprise a list of software parts 116 that are active 120 on aircraft 102 and thus comprise current software configuration 122 of aircraft 102. For example, without limitation, documented software configuration 156 may comprise current configuration software part 162. Current configuration software part 162 may be one of software parts 116 that comprise current software configuration 122 of aircraft 102 and may identify all of software parts 116 that comprise current software configuration 122.

Alternatively, or in addition, dataload planner 141 may be configured to use measured software configuration 160 to identify current software configuration 122 of aircraft 102 for use in determining dataload plan 143. Measured software configuration 160 may be determined by checking systems 104 on aircraft 102 to identify software parts 116 that are actually loaded 118 and active 120 on systems 104. Measured software configuration 160 thus also may be referred to as the actual software configuration of aircraft 102. Dataload planner 141 may be configured to determine measured software configuration 160 of aircraft 102 in any appropriate manner. Aircraft 102 may be said to be in conformance when documented software configuration 156 for aircraft 102 matches measured software configuration 160 of aircraft 102.

For example, without limitation, dataload planner 141 may be configured to use measured software configuration 160 for determining dataload plan 143 when dataload plan 143 is determined in response to a replacement or other change of hardware 110 on aircraft 102 or any other change on aircraft 102 that causes the actual configuration 124 of software 112 on aircraft 102 to change. In this case, dataload plan 143 may be configured to restore configuration 124 of software 112 on aircraft 102 to current software configuration 122 of aircraft 102 before the change took place. In this case, dataload planner 141 may use documented software configuration 156 to identify desired software configuration 142 for aircraft 102 and measured software configuration 160 to identify current software configuration 122 of aircraft 102 for determining dataload plan 143. For example, without limitation, in this case, documented software configuration 156 may comprise current configuration software part 162 that is currently loaded 118 and active 120 on aircraft 102. In this case, configuration software part 144 identifying desired software configuration 142 may be current configuration software part 162.

Dataload planner 141 may identify various options for loading software parts 126 on systems 104 to change current software configuration 122 of aircraft 102 to desired software configuration 142. Such options may be resolved by dataload planner 141 in any appropriate manner to determine dataload plan 143. For example, such options may be resolved automatically, by manual selection from among options by a human user, or both.

Dataload plan 143 may be used for loading software parts 126 on systems 104 on aircraft 102 to make software parts 116 active 120 on aircraft 102. For example, dataload plan 143 may be used by maintenance entity 136 to load and activate software parts 126 on systems 104 manually. For example, without limitation, dataload plan 143 may be provided to maintenance entity 136 and displayed on maintenance device 138 or another appropriate device. A technician may then load and activate software parts 126 on systems 104 on aircraft 102 by following the displayed dataload plan 143.

Dataloader 164 may be used to load software parts 126 on systems 104. For example, without limitation, maintenance entity 136 may use dataloader 164 to load software parts 126 on systems 104 by following dataload plan 143. Alternatively, dataload plan 143 may be implemented automatically by dataloader 164. For example, without limitation, dataloader 164 may be configured to load software parts 126 on systems 104 on aircraft 102 automatically in accordance with dataload plan 143.

Dataloader 164 also may be configured to generate dataload report 166. Dataload report 166 may identify the actions that were performed by or by using dataloader 164 to load and activate software parts 126 on systems 104 on aircraft 102. For example, without limitation, dataload report 166 may indicate whether or not software parts 126 were successfully loaded and activated on systems 104. Dataload report 166 may be provided to maintenance entity 136, the operator of aircraft 102, or any other appropriate entity or combination of entities. For example, without limitation, dataload report 166 may be configured for display on maintenance device 138.

The illustration of FIG. 1 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, dataload planner 141, dataloader 164, or both, may be implemented in hardware or in hardware in combination with software on aircraft 102. For example, a number of functions performed by dataload planner 141, dataloader 164, or both, may be implemented in aircraft network data processing system 134 on aircraft 102. Alternatively, or in addition, a number of functions performed by dataload planner 141, dataloader 164, or both, may be implemented in maintenance device 138 or in another data processing system that is not on aircraft 102. For example, without limitation, dataload plan 143 may be determined by dataload planner 141 implemented in a data processing system operated by or for an operator of aircraft 102 or another entity at a location remote from aircraft 102. In this case, dataload plan 143 may be provided to maintenance entity 136 to use for loading software parts 126 on systems 104 on aircraft 102. For example, without limitation, dataload plan 143 may be generated off of aircraft 102 and loaded on aircraft 102 for loading of software parts 126 on systems 104 on aircraft 102 by dataloader 164. For example, without limitation, dataload plan 143 may be included along with desired software configuration 142 in configuration software part 144 that is delivered to aircraft 102.

Figure 2:
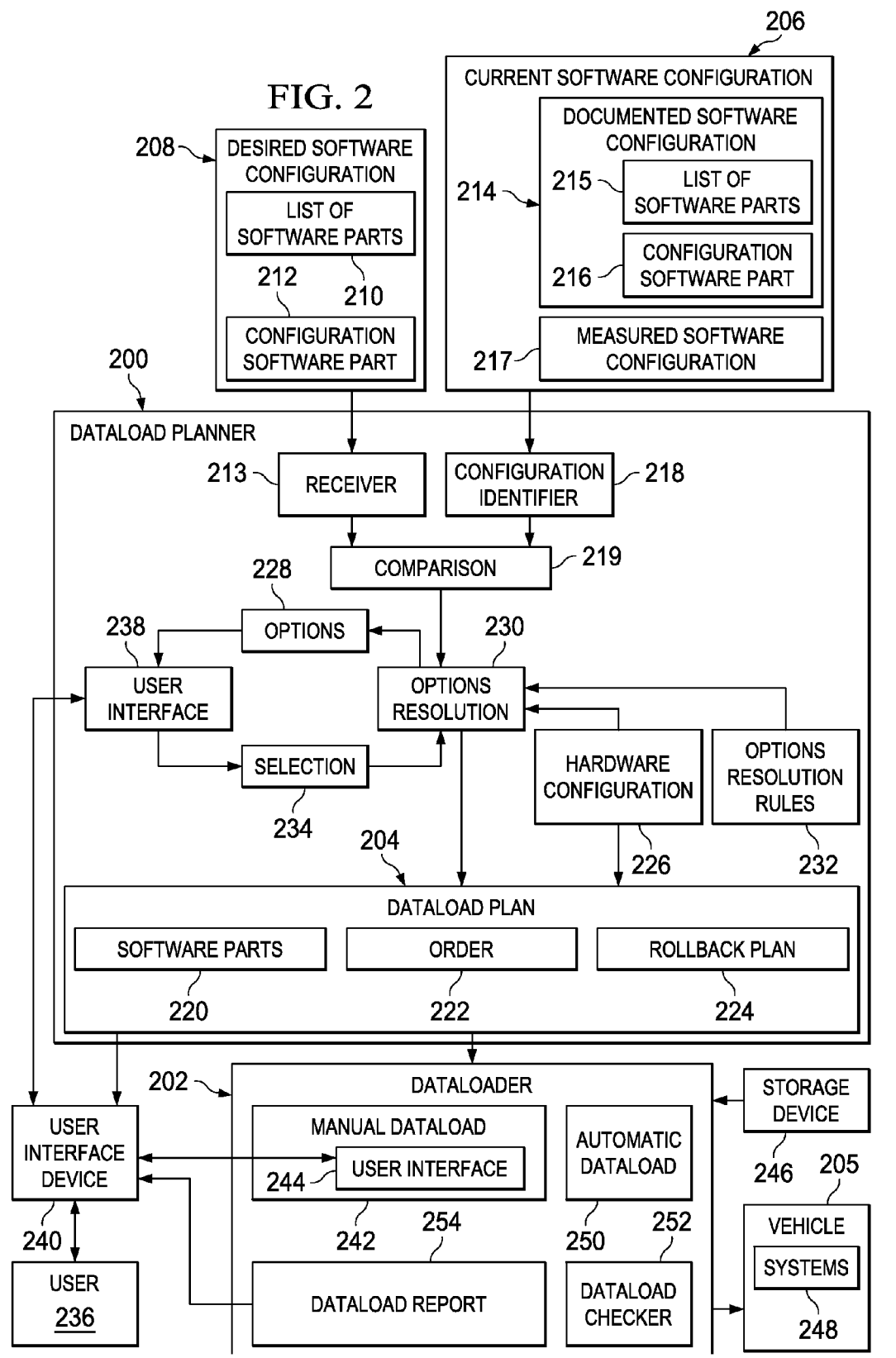
FIG. 2 is an illustration of a block diagram of a dataload planner in accordance with an illustrative embodiment.

Turning to FIG. 2, an illustration of a block diagram of a dataload planner is depicted in accordance with an illustrative embodiment. Dataload planner 200 may be an example of one implementation of dataload planner 141 in FIG. 1.

Dataload planner 200 is configured to generate dataload plan 204. Dataload plan 204 comprises a plan for loading software parts on vehicle 205. Vehicle 205 may be an aircraft or another type of vehicle. For example, vehicle 205 may be a vehicle configured to move through the air, in space, on water, on ground, under the ground, or in any other medium or various combinations of media.

Dataload plan 204 comprises a plan for loading software parts on vehicle 205 to change the configuration of the active software parts on vehicle 205 from current software configuration 206 to desired software configuration 208. Dataload planner 200 is configured to use information identifying current software configuration 206 and information identifying desired software configuration 208 to determine dataload plan 204.

Information identifying desired software configuration 208 may comprise list of software parts 210. List of software parts 210 identifies the software parts that will be loaded and active on vehicle 205 when current software configuration 206 of vehicle 205 is desired software configuration 208 of vehicle 205. Information identifying desired software configuration 208 may be received by dataload planner 200 in any appropriate manner and form.

For example, without limitation, information identifying desired software configuration 208 may comprise configuration software part 212 including list of software parts 210 for desired software configuration 208. For example, without limitation, configuration software part 212 may be a new configuration software part identifying a new desired software configuration 208 for vehicle 205. In any case, configuration software part 212 may be part of current software configuration 206 when configuration software part 212 is loaded and active on vehicle 205.

Dataload planner 200 may include receiver 213. Receiver 213 may be configured in any appropriate manner to receive information identifying desired software configuration 208 for use by dataload planner 200.

Information identifying current software configuration 206 may comprise documented software configuration 214. Documented software configuration 214 may comprise list of software parts 215 that is established before information identifying desired software configuration 208 is received by dataload planner 200 or otherwise before the process of determining dataload plan 204 by dataload planner 200 is started. List of software parts 215 identifies the software parts that are currently loaded and active on vehicle 205 and thus comprise current software configuration 206 of vehicle 205.

Documented software configuration 214 may be provided to or identified by dataload planner 200 in any appropriate manner and form. For example, without limitation, documented software configuration 206 may comprise configuration software part 216 including list of software parts 215. In this case, configuration software part 216 may be a current configuration software part that is loaded and active on vehicle 205 and part of current software configuration 206 of vehicle 205.

Alternatively, or in addition, information identifying current software configuration 206 may comprise measured software configuration 217. Measured software configuration 217 may be determined by checking vehicle 205 to identify software parts that are actually loaded and active on vehicle 205. Measured software configuration 217 may be identified after information identifying desired software configuration 208 for use in determining dataload plan 204 is received by dataload planner 200 or otherwise after the process of determining dataload plan 204 by dataload planner 200 has started.

Dataload planner 200 may include configuration identifier 218. Configuration identifier 218 may be implemented in any appropriate manner for identifying current software configuration 206. For example, configuration identifier 218 may be configured to identify current software configuration 206 using information in documented software configuration 214. Alternatively, or in addition, configuration identifier 218 may be configured to determine measured software configuration 217 of vehicle 205 in any appropriate manner.

Dataload planner 200 may be configured to perform comparison 219 between desired software configuration 208 and current software configuration 206 to determine the information identifying desired software configuration 208 and current software configuration 206 that will be used by dataload planner 200 to determine dataload plan 204. For example, if comparison 219 between information identifying desired software configuration 208 and documented software configuration 214 indicates that desired software configuration 208 is different from current software configuration 206 identified using documented software configuration 214, it may be determined that desired software configuration 208 is a new software configuration for vehicle 205. In this case, information identifying list of software parts 210 for the new software configuration and list of software parts 215 for current software configuration 206 identified by documented software configuration 214 may be used by dataload planner 200 to determine dataload plan 204.

If comparison 219 between information identifying desired software configuration 208 and documented software configuration 214 indicates that desired software configuration 208 is the same as current software configuration 206 identified using documented software configuration 214, it may be determined that desired software configuration 208 for vehicle 205 is current software configuration 206 for vehicle 205 as identified in documented software configuration 214. However, in this case, the actual configuration of active software parts on vehicle 205 may be different from the configuration of software parts identified in documented software configuration 214. For example, without limitation, such a difference between documented software configuration 214 and the actual configuration of active software parts on vehicle 205 may result from a replacement or other change of hardware on vehicle 205 or any other change on vehicle 205 that causes the actual configuration of active software parts on vehicle 205 to change. In this case, list of software parts 215 identified in documented software configuration 214 may be used to identify desired software configuration 208 and the actual configuration of active software parts for vehicle 205 identified by measured software configuration 217 may be used to identify current software configuration 206 for determining dataload plan 204 by dataload planner 200.

Dataload planner 200 also may be configured to perform comparison 219 between information identifying desired software configuration 208 and current software configuration 206 to identify software parts 220 that need to be loaded and made active on vehicle 205 to change the configuration of the active software parts on vehicle 205 from current software configuration 206 to desired software configuration 208. For example, without limitation, software parts 220 that need to be loaded and made active on vehicle 205 may be identified by using comparison 219 to determine the difference between list of software parts 210 for desired software configuration 208 and list of software parts 215 for current software configuration 206. Software parts 220 that may need to be loaded and made active on vehicle 205 to change the configuration of the active software parts on vehicle 205 from current software configuration 206 to desired software configuration 208 may be identified in dataload plan 204 in any appropriate manner.

Dataload planner 200 also may be configured to determine order 222 in which software parts 220 should be loaded on vehicle 205. Order 222 for loading software parts 220 to make software parts 220 active on vehicle 205 may be determined by dataload planner 200 in any appropriate manner. Order 222 for loading software parts 220 on vehicle 205 may be identified in dataload plan 204 in any appropriate manner.

Dataload planner 200 also may be configured to determine rollback plan 224. Rollback plan 224 may comprise a plan for returning the software configuration of vehicle 205 to current software configuration 206 if it is determined, after loading of software parts 220 on vehicle 205 in accordance with dataload plan 204 has begun, that any of software parts 220 cannot be loaded and activated or were not loaded successfully on vehicle 205. Rollback plan 224 may provide a plan for returning the software configuration of vehicle 205 to current software configuration 206 from a plurality of different points in the sequence for loading software parts 220 on vehicle 205 identified in dataload plan 204. For example, without limitation, rollback plan 224 may provide a plan for returning the software configuration of vehicle 205 to current software configuration 206 from any point in the execution of dataload plan 204 at which it may be determined that one of software parts 220 identified in dataload plan 204 cannot be loaded and made active on vehicle 205 for any reason. Rollback plan 224 may be determined by dataload planner 200 in any appropriate manner. Rollback plan 224 may be identified in any appropriate manner and form as part of dataload plan 204 or separate from dataload plan 204.

Dataload planner 200 may take into account hardware configuration 226 of vehicle 205 in determining dataload plan 204. For example, dataload planner 200 may use information identifying hardware configuration 226 of vehicle 205 to determine one or more of software parts 220 to be loaded and made active on vehicle 205, order 222 for loading software parts 220 on vehicle, and rollback plan 224. Hardware configuration 226 of vehicle 205 may be identified by or for dataload planner 200 in any appropriate manner.

Dataload planner 200 may identify various options 228 for loading software parts 220 to change current software configuration 206 of vehicle 205 to desired software configuration 208. Dataload planner 200 may be configured to perform options resolution 230 to determine which of options 228 to use in determining dataload plan 204. For example, without limitation, options resolution 230 may be performed by dataload planner 200 automatically using appropriate options resolution rules 232.

Alternatively, or in addition, options resolution 230 may include receiving selection 234 of options 228 from user 236. For example, without limitation, user 236 may be a technician or other appropriate user of dataload planner 200 or dataloader 202 for loading software parts on an aircraft. Dataload planner 200 may be configured to present options 228 to user 236 via user interface 238. For example, without limitation, user interface 238 may be configured to display options 228, prompt user to make selection 234 from among displayed options 228, and receive selection 234 from user 236. User interface 238 may be presented to user 236 on user interface device 240. For example, without limitation, user interface device 240 may include appropriate input and output devices on a portable maintenance device.

Dataload plan 204 may be used along with dataloader 202 to load software parts 220 on vehicle 205 in order 222 identified in dataload plan 204. For example, dataload plan 204 may be used to perform manual dataload 242 using dataloader 202. In this case, dataload plan 204 may be displayed to user 236. User 236 may then follow the displayed dataload plan 204 using user interface 244 on dataloader 202 to load software parts 220 from storage device 246 on vehicle 205 to systems 248 on vehicle 205 in order 222 identified in dataload plan 204. Alternatively, dataloader 202 may be configured to use dataload plan 204 to perform automatic dataload 250 of software parts 220.

Dataloader 202 may include dataload checker 252. Dataload checker 252 may be configured to determine if the dataload of software parts 220 is successful. Rollback plan 224 may be implemented to return the software configuration of vehicle 205 to current software configuration 206 in response to a determination that the dataload of software parts 220 is not successful.

Dataloader 202 also may be configured to generate dataload report 254. Dataload report 254 may identify the actions that were performed by or by using dataloader 202 to load software parts 220 onto systems 248 on vehicle 205. For example, without limitation, dataload report 254 may indicate whether or not software parts 220 were successfully loaded on systems 248. Dataload report 254 may be provided to user 236 via user interface device 240.

Figure 3:
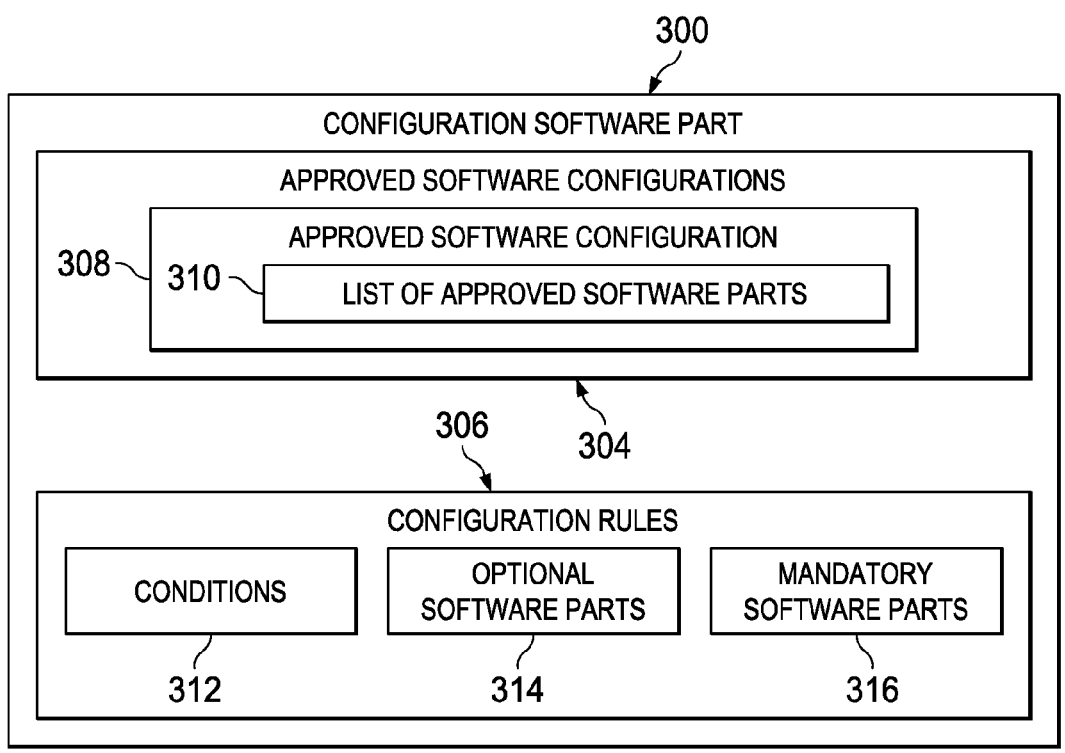
FIG. 3 is an illustration of a block diagram of a configuration software part in accordance with an illustrative embodiment.

Turning to FIG. 3, an illustration of a block diagram of a configuration software part is depicted in accordance with an illustrative embodiment. Configuration software part 300 is an example of one implementation of configuration software part 212 and configuration software part 216 in FIG. 2. Additional description of configuration software parts and the handling and use thereof is provided in U.S. patent application Ser. No. 14/097,982, filed Dec. 5, 2013, and entitled Aircraft Configuration and Software Part Management Using a Configuration Software Part, the disclosure of which is incorporated herein by reference.

Configuration software part 300 may include information identifying approved software configurations 304 for an aircraft or other vehicle and configuration rules 306. Each approved software configuration 308 in approved software configurations 304 may include a list of approved software parts 310 for approved software configuration 308.

Configuration rules 306 may include information for determining which of approved software configurations 304 should be used for an aircraft or other vehicle for particular conditions 312. For example, configuration rules 306 may identify optional software parts 314 and mandatory software parts 316 for approved software configurations 304 for particular conditions 312. For example, without limitation, conditions 312 may include particular hardware configurations of the aircraft or other vehicle. Configuration rules 306 may be identified in configuration software part 300 in any appropriate manner.

Figure 4:
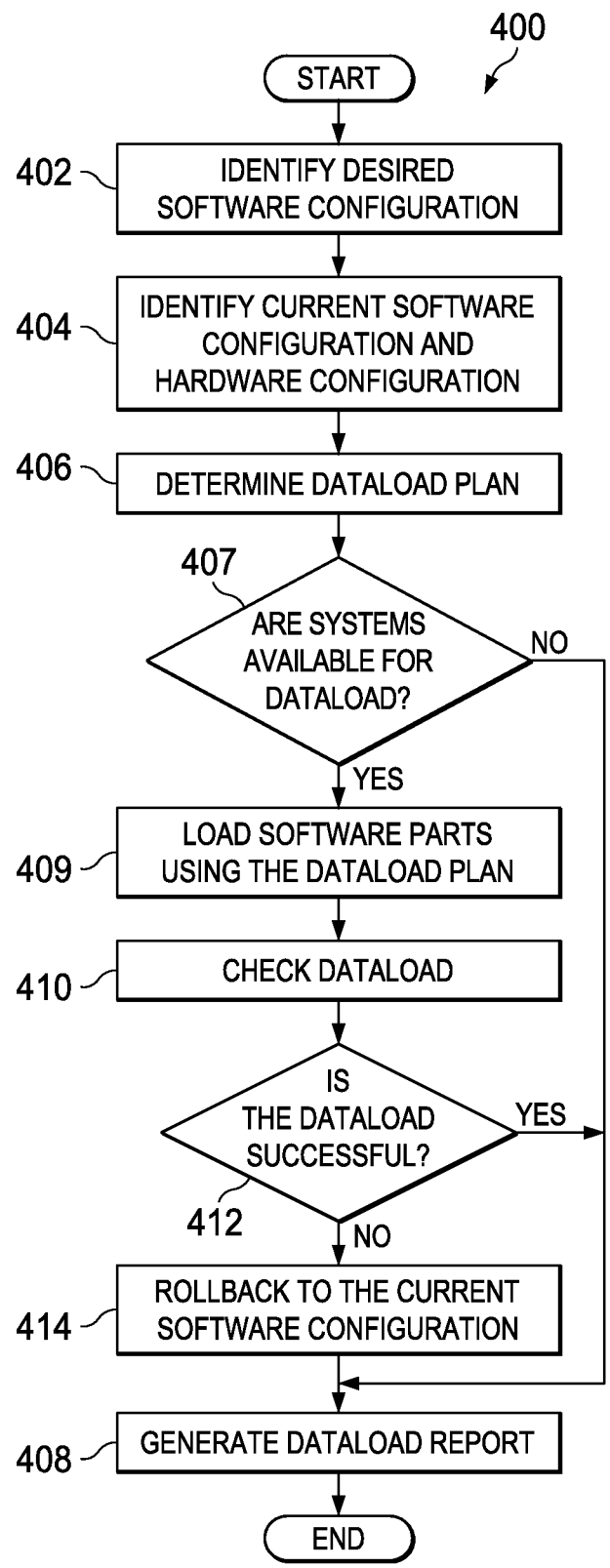
FIG. 4 is an illustration of a flowchart of a process for loading software parts in accordance with an illustrative embodiment.

Turning to FIG. 4, an illustration of a flowchart of a process for loading software parts is depicted in accordance with an illustrative embodiment. For example, process 400 may be implemented using dataload planner 200 and dataloader 202 in FIG. 2.

Process 400 may begin by identifying a desired software configuration for an aircraft or other vehicle (operation 402). A current software configuration and hardware configuration of the aircraft or other vehicle also may be identified (operation 404). A dataload plan for loading software parts on the aircraft or other vehicle then may be determined using the desired software configuration, the current software configuration, and the hardware configuration of the aircraft or other vehicle (operation 406). The dataload plan generated in operation 406 may identify an order for loading software parts on the aircraft or other vehicle. The dataload plan generated in operation 406 also may include a rollback plan for returning the software configuration of the aircraft or other vehicle to the current software configuration.

It may be determined whether the systems on which software parts are to be loaded in accordance with the dataload plan are available to have the software parts loaded on them (operation 407). If is determined that any of the systems are not available, a dataload report may be generated (operation 408), indicating that the dataload plan could not be executed, with the process terminating thereafter.

If it is determined at operation 407 that the systems on which the software parts are to be loaded are available, the dataload plan generated in operation 406 may be used to load the software parts and make the software parts active on the aircraft or other vehicle (operation 409). The dataload of the new software parts may be checked (operation 410) to determine whether or not the dataload of the software parts is successful (operation 412). If the dataload is not successful, the software configuration of the aircraft or other vehicle may be rolled back to the current software configuration of the aircraft or other vehicle before the dataload of the software parts began (operation 414). For example, the rollback plan generated in operation 406 as part of the dataload plan may be used to perform the rollback in operation 414.

If the dataload is not successful, the dataload report may be generated at operation 408 to indicate that the dataload was not successful and that the software configuration of the aircraft or other vehicle was rolled back to the current software configuration of the aircraft or other vehicle before the dataload of the software parts began, with the process terminating thereafter. If it is determined at operation 412 that the dataload is successful, the dataload report may be generated at operation 408 to indicate that the dataload was successful, with the process terminating thereafter.

Figure 5:
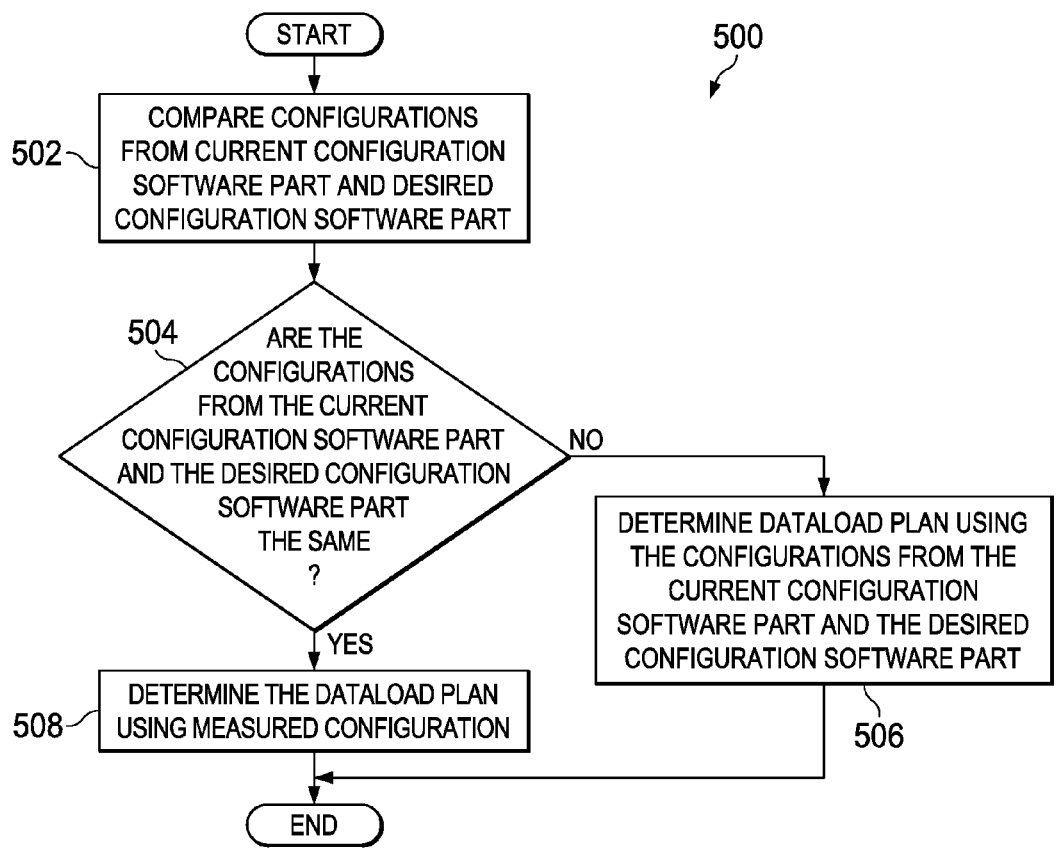
FIG. 5 is an illustration of a flowchart of a process for identifying a current software configuration and a desired software configuration to use for determining a dataload plan in accordance with an illustrative embodiment.

Turning to FIG. 5, an illustration of a flowchart of a process for identifying a current software configuration and a desired software configuration to use for determining a dataload plan is depicted in accordance with an illustrative embodiment. For example, process 500 may be used to implement operations 402 and 404 in process 400 in FIG. 4.

Process 500 may begin by comparing the software configuration defined in a current configuration software part for an aircraft or other vehicle with the software configuration defined in a desired configuration software part for the aircraft or other vehicle (operation 502). Based on the comparison at operation 502, it is determined whether the software configuration defined in the current configuration software part is the same as the software configuration defined in the desired configuration software part (operation 504). If it is determined at operation 504 that the software configuration defined in the current configuration software part is not the same as the software configuration defined in the desired configuration software part, a dataload plan may be determined using the software configuration defined in the current configuration software part and the software configuration defined in the desired configuration software part (operation 506), with the process terminating thereafter. If it is determined at operation 504 that the software configuration defined in the current configuration software part is the same as the software configuration defined in the desired configuration software part, a dataload plan may be determined using a measured configuration of the software in the aircraft or other vehicle (operation 508), with the process terminating thereafter.

Figure 6:
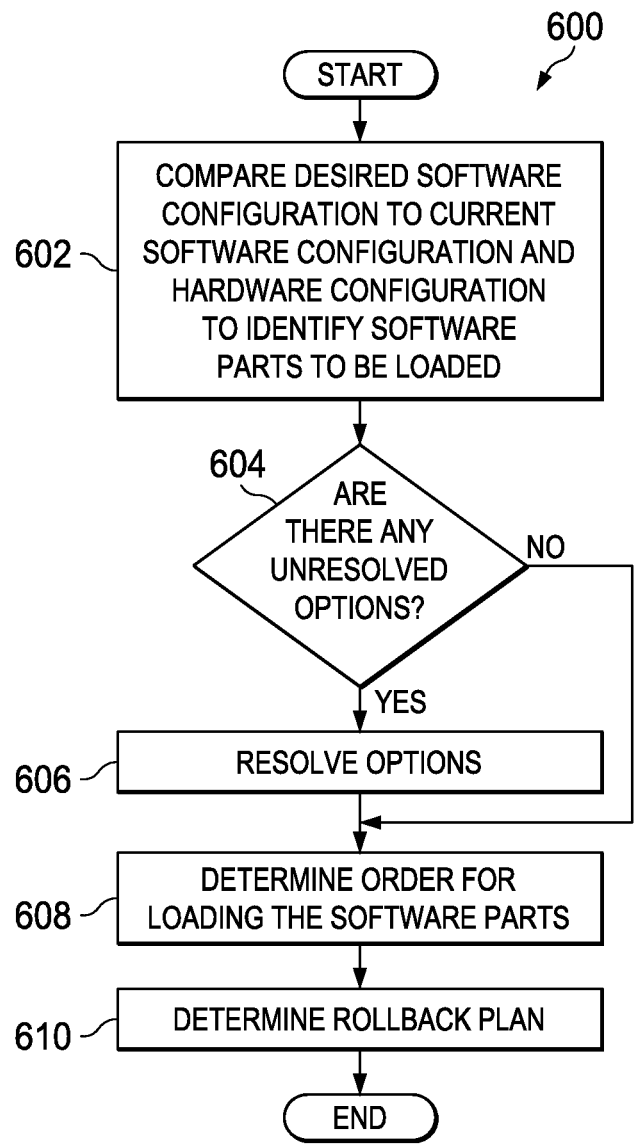
FIG. 6 is an illustration of a flowchart of a process for determining a dataload plan for loading software parts in accordance with an illustrative embodiment.

Turning to FIG. 6, an illustration of a flowchart of a process for determining a dataload plan for loading software parts is depicted in accordance with an illustrative embodiment. For example, process 600 may be used to implement operation 406 in process 400 in FIG. 4.

Process 600 may begin by comparing a desired software configuration for an aircraft or other vehicle to a current software configuration and hardware configuration of the aircraft or other vehicle to identify software parts to be loaded on the aircraft or other vehicle (operation 602). It may be determined whether there are any unresolved options for loading the software parts on the aircraft (operation 604). If there are any unresolved options, the options are resolved (operation 606). After the unresolved options are resolved at operation 606, or if no unresolved options are identified at operation 604, an order for loading the software parts may be determined (operation 608). A rollback plan also may be determined (operation 610), with the process terminating thereafter.

The flowcharts and block diagrams in the different depicted embodiments illustrate the architecture, functionality, and operation of some possible implementations of apparatuses and methods in illustrative embodiments. In this regard, each block in the flowcharts or block diagrams may represent a module, segment, function, and/or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order shown in the figures. For example, in some cases, two blocks shown in succession may be executed substantially concurrently, or the blocks may sometimes be performed in the reverse order, depending upon the functionality involved. Also, other blocks may be added in addition to the blocks illustrated in a flowchart or block diagram.

Figure 7:
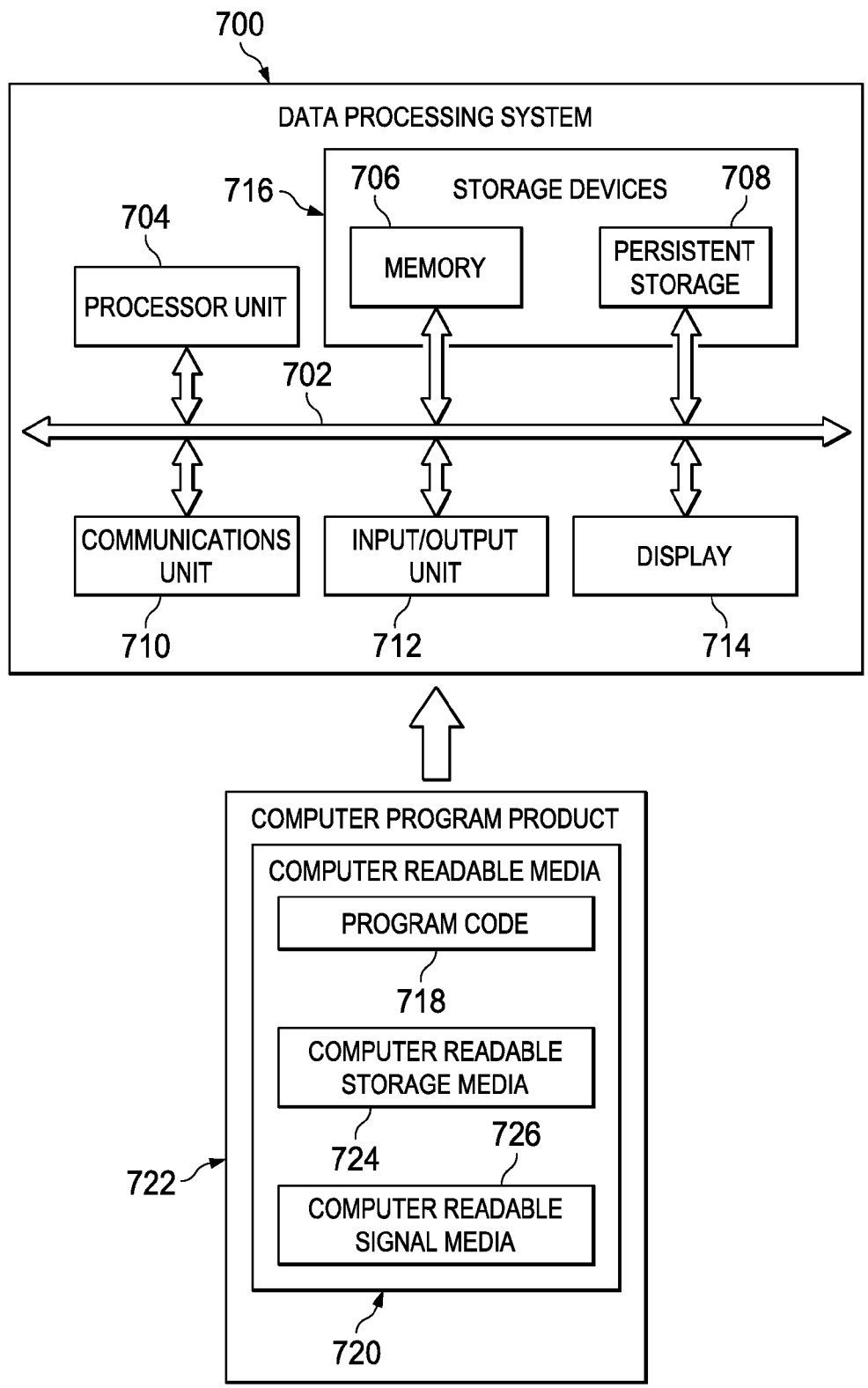
FIG. 7 is an illustration of block diagram of a data processing system in accordance with an illustrative embodiment.

Turning to FIG. 7, an illustration of a block diagram of a data processing system is depicted in accordance with an illustrative embodiment. Data processing system 700 may be an example of one implementation of aircraft network data processing system 134 on aircraft 102 in FIG. 1. Data processing system 700 also may be an example of one implementation of a data processing system for implementing one or both of dataload planner 200 and dataloader 202 in FIG. 2.

In this illustrative example, data processing system 700 includes communications fabric 702. Communications fabric 702 provides communications between processor unit 704, memory 706, persistent storage 708, communications unit 710, input/output (I/O) unit 712, and display 714.

Processor unit 704 serves to execute instructions for software that may be loaded into memory 706. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program instructions, program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or transmit and receive data. Communications unit 710 may be, for example, a modem or a network adapter, two network adapters, or some combination thereof. Further, a memory may be, for example, memory 706, or a cache, such as found in an interface and memory controller hub that may be present in communications fabric 702.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of loading software parts on a vehicle, comprising:
  receiving, by a processor unit on the vehicle, information identifying a desired software configuration for active software parts on the vehicle;
  receiving, by the processor unit, a configuration software part on the vehicle, wherein the configuration software part comprises a list of the software parts for the desired software configuration;
  identifying, by the processor unit, a current software configuration of the active software parts on the vehicle;
  comparing, by the processor unit, the current software configuration and the desired software configuration to determine if the configurations are the same;
  in response to the determination that the configurations are not the same, determining a dataload plan for loading the list of the software parts on the vehicle using the current software configuration and the desired software configuration;
  in response to the determination that the configurations are the same, determining the dataload plan using a measured configuration that is determined by checking the vehicle to identify software parts that are actually loaded and active on the vehicle;

wherein the dataload plan identifies an order for loading the list of the software parts on the vehicle, and wherein the dataload plan is determined on the vehicle;

loading the configuration software part on the vehicle, wherein the configuration software part becomes part of the current software configuration when the configuration software part is loaded on the vehicle; and using the dataload plan for loading the list of the software parts on the vehicle to make the list of the software parts active on the vehicle.

2. The method of claim 1 further comprising:
identifying, by the processor unit, the desired software configuration using the configuration software part.

3. The method of claim 1, wherein identifying the current software configuration comprises identifying the current software configuration using a documented software configuration comprising a list of the active software parts on the vehicle.

4. The method of claim 3, wherein identifying the current software configuration comprises identifying the current software configuration using a current configuration software part comprising the list of the active software parts on the vehicle, wherein the current configuration software part is part of the current software configuration of the vehicle.

5. The method of claim 1, wherein identifying the current software configuration comprises checking systems on the vehicle to identify the software parts that are actually active on the systems on the vehicle.

6. The method of claim 1, wherein determining the dataload plan comprises:
comparing the desired software configuration to the current software configuration to identify software parts that need to be loaded on the vehicle to change the active software parts on the vehicle from the current software configuration to the desired software configuration; and
determining the order for loading the software parts needed to be loaded on the vehicle.

7. The method of claim 1 further comprising:
identifying a hardware configuration of hardware on the vehicle; and
determining the dataload plan based on the hardware configuration, the desired software configuration, and the current software configuration.

8. The method of claim 1, wherein determining the dataload plan comprises
determining a rollback plan for restoring the active software parts on the vehicle to the current software configuration after using the dataload plan to load the list of the software parts on the vehicle has begun but is not completed.

9. The method of claim 1, wherein using the dataload plan for loading the list of the software parts on the vehicle comprises at least one of:
displaying the dataload plan to a user on the vehicle; and
automatically following the dataload plan and loading the list of the software parts on the vehicle by a dataloader.

10. The method of claim 1, wherein the vehicle comprises an aircraft and the list of the software parts and active software parts comprise software parts for line-replaceable units on the aircraft.

11. An apparatus, comprising:
a data processing system onboard a vehicle, the data processing system comprising a processor unit having a number of processors configured to implement a dataload planner configured to:

receive information identifying a desired software configuration for active software parts on the vehicle,
receive a configuration software part comprising a list of the software parts for the desired software configuration;
identify a current software configuration of the active software parts on the vehicle, and
compare the current software configuration and the desired software configuration to determine if the configurations are the same;
in response to the determination that the configurations are not the same, determine a dataload plan for loading the list of the software parts on the vehicle using the current software configuration and the desired software configuration;
in response to the determination that the configurations are the same, determine the dataload plan using a measured configuration that is determined by checking the vehicle to identify software parts that are actually loaded and active on the vehicle;
wherein the dataload plan identifies an order for loading the list of the software parts on the vehicle, and wherein the dataload plan is determined on the vehicle; and
load the configuration software part on the vehicle to load the list of the software parts and make the list of the software parts active on the vehicle, wherein the configuration software part becomes part of the current software configuration when the configuration software part is loaded on the vehicle.

12. The apparatus of claim 11, wherein the dataload planner is configured to identify the desired software configuration using the configuration software part.

13. The apparatus of claim 11, wherein the dataload planner is configured to identify the current software configuration using a documented software configuration comprising a list of the active software parts on the vehicle.

14. The apparatus of claim 13, wherein the dataload planner is configured to identify the current software configuration using a current configuration software part comprising the list of the active software parts on the vehicle, wherein the current configuration software part is part of the current software configuration of the vehicle.

15. The apparatus of claim 11, wherein the dataload planner is configured to identify the current software configuration by checking systems on the vehicle to identify the software parts that are actually active on the systems on the vehicle.

16. The apparatus of claim 11, wherein the dataload planner is configured to:
compare the desired software configuration to the current software configuration to identify software parts that need to be loaded on the vehicle to change the active software parts on the vehicle from the current software configuration to the desired software configuration; and
determine the order for loading the software parts needed to be loaded on the vehicle.

17. The apparatus of claim 11, wherein the dataload planner is configured to:
identify a hardware configuration of hardware on the vehicle; and
determine the dataload plan based on the hardware configuration, the desired software configuration, and the current software configuration.

18. The apparatus of claim 11, wherein the dataload planner is configured to determine a rollback plan for restoring the active software parts on the vehicle to the current software configuration after using the dataload plan to load the list of the software parts on the vehicle has begun but is not completed.

19. The apparatus of claim 11, wherein the vehicle comprises an aircraft and the list of the software parts and active software parts comprise software parts for line-replaceable units on the aircraft.

* * * * *